United States Patent
Le Bris et al.

(10) Patent No.: US 10,238,229 B2
(45) Date of Patent: Mar. 26, 2019

(54) ARTICLE INCLUDING A HEAT-STABLE COATING PROVIDED WITH AN AT LEAST TWO-COLOR DECORATION HAVING CONTINUOUS TONES

(71) Applicant: SEB S.A., Ecully (FR)

(72) Inventors: Stephanie Le Bris, Chambery (FR); Pierre Jean Muller, Saint Felix (FR); Jean-Luc Perillon, Saint Paul Trois Chateaux (FR)

(73) Assignee: SEB S. A., Ecully (FR)

( * ) Notice: Subject to any disclaimer, the term of this patent is extended or adjusted under 35 U.S.C. 154(b) by 0 days.

(21) Appl. No.: 15/710,877

(22) Filed: Sep. 21, 2017

(65) Prior Publication Data

US 2018/0008081 A1    Jan. 11, 2018

Related U.S. Application Data

(62) Division of application No. 13/996,792, filed as application No. PCT/FR2011/053151 on Dec. 22, 2011, now Pat. No. 9,788,677.

(30) Foreign Application Priority Data

Dec. 23, 2010  (FR) ..................... 10 61218

(51) Int. Cl.
*A47J 27/00* (2006.01)
*B41M 5/00* (2006.01)
*A47J 36/02* (2006.01)
*A47J 47/16* (2006.01)
*C23D 5/06* (2006.01)

(52) U.S. Cl.
CPC ............ *A47J 27/002* (2013.01); *A47J 36/02* (2013.01); *A47J 47/16* (2013.01); *B41M 5/0047* (2013.01); *B41M 5/0058* (2013.01); *C23D 5/06* (2013.01); *Y10T 428/31678* (2015.04); *Y10T 428/31685* (2015.04); *Y10T 428/31721* (2015.04)

(58) Field of Classification Search
CPC .. B41M 5/0047; B41M 5/0058; A47J 27/002; A47J 36/02; A47J 47/16; Y10T 428/31678; Y10T 428/31685; Y10T 428/31721

See application file for complete search history.

(56) References Cited

U.S. PATENT DOCUMENTS

2010/0181322 A1    7/2010  Perillon et al.

FOREIGN PATENT DOCUMENTS

| JP | H04198977 A | 7/1992 |
|----|-------------|--------|
| JP | 2006267260 A | 10/2006 |
| JP | 2010185483 A | 8/2010 |
| JP | 2011143086 A | 7/2011 |
| JP | 5049541 B2 | 10/2012 |
| KR | 20070117247 A | 12/2007 |
| WO | 2006/126189 A1 | 11/2006 |
| WO | 2008/142327 A2 | 11/2008 |

*Primary Examiner* — Betelhem Shewareged
(74) *Attorney, Agent, or Firm* — The Webb Law Firm (57) ABSTRACT

A heating article includes a substrate having two opposite surfaces, at least one of which is opaque, and a heat-stable coating arranged on the opaque surface. The heat-stable coating includes an at least two-color decoration having continuous tones and being provided in the form of a continuous or discontinuous layer.

19 Claims, 2 Drawing Sheets

Legend:

Fig. 8

ARTICLE INCLUDING A HEAT-STABLE COATING PROVIDED WITH AN AT LEAST TWO-COLOR DECORATION HAVING CONTINUOUS TONES

CROSS REFERENCE TO RELATED APPLICATIONS

This application is a divisional of U.S. patent application Ser. No. 13/996,792 filed Dec. 22, 2011, which is the United States national phase of International Application No. PCT/FR2011/053151 filed Dec. 22, 2011, which claims priority to French Patent Application No. 1061218 filed Dec. 23, 2010, the disclosures of which are hereby incorporated in their entirety by reference.

FIELD OF THE INVENTION

The present invention relates to an article comprising a heat-stable coating provided with an at least two-color decoration and method for manufacturing such an article. The present invention also relates to a method for manufacturing such articles, wherein the decoration is applied by ink jet printing.

DESCRIPTION OF RELATED ART

Several types of techniques are known for decorating a culinary article.

Particularly, it is known by the skilled person to use screen printing or tamp print techniques in order to apply patterns on flat surfaces to decorate them. These techniques allow for a shaping operation of the article achieved following the application of patterns by screen printing or tamp print.

If screen printing is used (or tamp print) to apply multi-colored patterns, several screen printing (or tamp print) operations should then be carried out one after the other according to the number of colors: each color requiring a pass of screen time (or tamp print), considering that each print must be followed by a drying operation before printing the following layer of ink. Such a printing technique is only profitable when the same image or pattern is applied on a large number of supports. For printing a small number of pieces, a screen print (or tamp print) in several colors is very expensive and is certainly not profitable in as far as a separate screen (or engraved print) is necessary for each base color. Furthermore, the cost of making and cleaning of the printing screen is high, the time it takes to realize the screen is long thus, requiring flawless planning of the productions. Furthermore, the change of tint although it is achieved in an identical style requires neat cleaning which reduces the production time. (Likewise for the engraved print). Furthermore, the screen print and tamp print techniques generate important stocks of products and intermediary products (particularly inks, screens, half-finished bowls, etc).

It is also known to use the printing technique by sublimation in order to obtain a decorated culinary article. Generally, the sublimation is the transformation of a solid body into gas or vapor, without going through a liquid stage. According to the sublimation printing technique, the pattern initially printed on a support (paper of plastic film) is pressed flat against the surface of the article to be decorated, then the whole is briefly taken to a temperature between 150° and 210° C. The traditional sublimation printing is only used on flat-shaped articles because the pressure of the support on an article of non-flat shape results in its creasing and consequently results in printing flaws. However, it is known, by referenced documents EP 0451067 and EP 544 603, improvements of the sublimation printing method which make it possible to decorate all the sides of an article of any shape whatsoever. However, such improvements make printing methods by sublimation very complex to implement and hardly productive.

Figure 8:
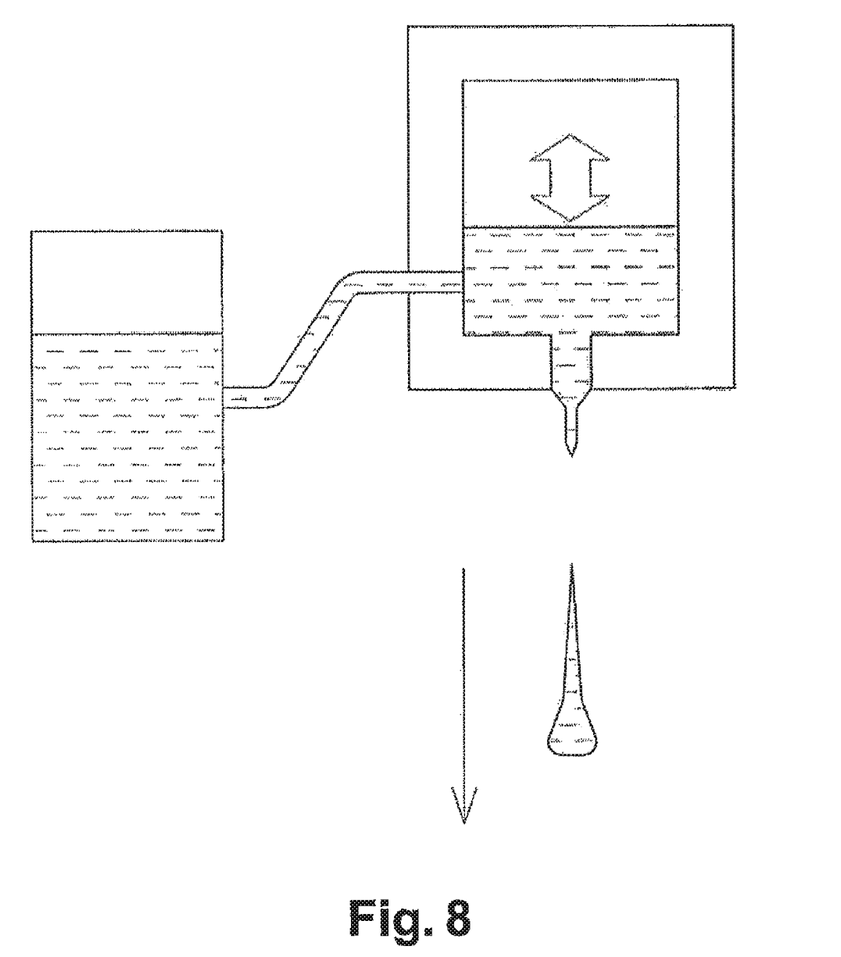
FIG. 8 represents a cross-sectional schematic view of an industrial device for ink jet decorating.

Furthermore, and as illustrated on FIG. 8, it is known to use a printing technique called ink-jet which consists in projecting droplets of ink from a small opening to perfectly determined positions on a support, such as to create an image. The ink-jet printing is the only contactless printing technique. Two types of ink-jet printing techniques are distinguishable: the first is called "continuous ink jet" corresponding to its abbreviation CIJ and the second is called "drop on demand" corresponding to abbreviation DOD.

The ink-jet printing technique intrinsically has advantages which, parallel to the development of IT tools and to an increase in the quality and printing speeds, explain its success. On the one hand, the absence of a printing form (screen, engraved print) eliminates the preparation work that is necessary for the implementation of other printing techniques, particularly the preparation of the screens, the engraving of the prints or, where necessary, the supports (paper or plastic film). On the other hand, the dynamic management of the printing data, which more particularly vary with each page to be printed, makes it possible to personalize documents and allow for the print run of very small series without incurring unacceptably high costs.

Apart from office work and the personalization of documents, the applications of ink jet printing are multiple: posters in large and very large format, printing on textiles, ceramic decoration, labeling, addressing, printing on food, deposit of active principles, deposit of biomaterials, conductive ink printing, etc.

Among the applications of the ink jet printing technique, one application relates to the decoration of articles whereof the manufacturing method requires high temperature curing. These articles are more particularly ceramic squares. In the field of manufacturing ceramic articles, the manufacturing techniques, for example sintering or the fusion of powders, bring the articles to temperatures of at least 300° C. that can reach 1300° C. and beyond. Thereby, it is not possible to print decorations according to the ink jet technique by using standard inks such as used in paper or textile printing.

Special inks, but also printing heads and adapted software have been developed. It is cited, for example, the QuickPaint® inks and the KERAJET printer according to their respective commercial name.

In the field of culinary articles exhibiting a decoration printed by ink jet, document JP05049541 teaches a stratified material comprising a substrate, a first layer to ensure the adhesion with the substrate, a printing layer deposited on the first layer and an upper layer consisting in a fluoro-resin deposited on the printing layer. This material solves the problem of localized engraving, for example capacity engraving, for which pre-existent solutions were based on a mechanical engraving (reliefs) which weakened the coating (fast wear). Furthermore, the decoration of the material JP 05049541 is monochrome and composed of the combination of points having a surface of approximately 2 mm². Nothing is said in JP 05049541 as regards a decoration comprising several colors.

It is further known by the Korean patent application KR2007/0117247 a method of ink jet printing of patterns on the surface of a culinary article covered beforehand by a white opaque sub-layer, whereon is deposited an organic transparent ink receiving layer, involving a thinner and a hardener of organic nature in order to allow for a good adhesion of the projected ink. After printing the patterns on the receiving layer, a protective coating layer is applied on the printed patterns, then undergoes a curing at a temperature lower than 300° C.

However, in order to obtain coatings of heating articles exhibiting satisfactory functional properties, (particularly in terms of anti-adhesion for PTFE-based coatings or in terms of shine and hardness for enameled coatings), the composition of the protective coating layer requires for its solidification a curing temperature higher than 300° C. In fact, such a temperature is necessary in order to obtain a fluorocarbon resin-based sintered coating (for example PTFE) or vitrified (in the case of an enameled coating).

However, with such conditions of implementation, it is not to be considered to achieve a coating comprising an organic ink receiving layer, a decoration layer obtained by ink jet printing and a fluorocarbon resin based or vitrified sintered protective coating layer (in the case of an enamel). In fact, during curing (at a temperature higher than 300° C.), the organic components of the receiver layer become degraded and are trapped by the finishing layer, thus causing a tanning of the coating and hides the patterns.

SUMMARY OF THE INVENTION

In order to resolve this issue, the applicant has discovered that it was possible to do without the ink receiving layer by depositing by ink jet printing a composition of decoration directly on an opaque side of a support (for example of a metal hollow bowl of a culinary article).

By opaque side, is meant, as defined by the present invention, a side that is intrinsically opaque by the nature of the constitutive material of the support, or which has become opaque by covering by a continuous opaque sub-layer.

By way of examples of intrinsically opaque materials, is meant, as defined by the present invention aluminum or aluminum alloys, magnesium or magnesium alloys, stainless steels, cast irons, copper, titanium and more generally metals and metallic alloys, ceramics (porcelain, faience and more generally culinary pottery), where the composite materials comprise a plurality of layers of one or several of the previous materials (in this instance co-laminated metals)

By opaque sub-layer, is meant, as defined by the present invention, a layer of material comprising a chemical substance optically non transparent, for example a substance chosen among the heat-stable or thermochromic pigments, the colored or metal flakes, the opacifying fillers and their combinations.

The opaque sub-layer is preferably pigmented, and better if it is a black or a white color, and even better if white.

The adhesion of the "ink jet" decoration thus formed on the support is ensured:
either by superficial absorption thanks to the porosity of the support itself of the sub-layer if need be,
or thanks to the composition of the ink of the ink jet decoration which comprises a binder.

More particularly, the purpose of the present invention is a heating article comprising a substrate having two opposite sides, whereof one is at least opaque, and a heat-stable coating arranged on said opaque side.

According to the invention, the heat-stable coating comprises a decoration of at least two colors in continuous tones in the form of a continuous or discontinuous layer, and the heating article has been subjected to a curing at a temperature higher than 300° C.

By decoration in continuous tones, is meant, as defined by the present invention, a decoration which can comprise all the shades between the lightest tones and the darkest ones, without points appearing, which is different from a decoration in direct tone or in color block resulting in a high contrast, such as for example the decoration described in international patent WO2008/142327 belonging to the present applicant.

By heating article, is meant, as defined by the present invention an article having its own heating system, or which is heated by an outer system and which is able to transmit the calorific energy brought by this system to a third material or object in contact with said article.

If the substrate is not intrinsically opaque, it is indispensable to recover beforehand the side to be decorated by an opaque sub-layer, on which the decoration is printed. An appropriate sub-layer is such as described previously and exhibits the aforementioned properties.

According to a first embodiment of the heating article according to the invention, the decoration is exempt from binders. In this case, the adhesion of the decoration to the support is ensured by the porosity of the support or of the sub-layer, if need be, by superficial absorption of the decoration. Advantageously, the support or the sub-layer that is covered by the decoration exempt from binders is not smooth and has a superficial roughness Ra lower or equal to 10 μm.

According to a second embodiment of the heating article according to the invention, the decoration comprises at least a heat-stable binder compatible with the substrate and/or, if need be with the sub-layer. In this case, the adhesion of the decoration to the support is ensured by the binder of the composition of the decoration. It is thus, not necessary that the support be porous.

By heat-stable binder, is meant, as defined by the present invention, a heat-stable binder at, at least 300° C.

By way of heat-stable binder usable in the layer of decoration according to the invention, one may particularly cite enamels, fluorocarbon resins (alone or in combination), inorganic polymers or organic-inorganic hybrids synthesized by sol-gel process, silicones, silicon-polyesters, polyimids, polyphenylene sulfide (PPS), ethylene sulphide polymer (PES), polyetheretherketones (PEEK), polyetherketones (PEK), polyamids-imids (PAI) silicones, fluorosilicones, polybenzimidazoles (PBI), considering that these materials must be finely dispersible or solubilizable in the composition of the decoration.

The heat-stable coating according to the invention may further comprise a continuous finishing layer. It can be deposited on the decoration, and is necessarily transparent such as not to conceal the decoration.

By transparent coating (whether it be particularly sol-gel coating or the finishing layer), is meant, as defined by the present invention, a coating letting all or part of the decoration be visible.

Figure 7:
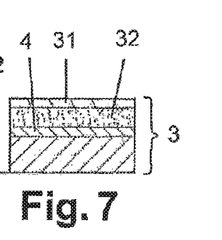

This finishing layer may also be disposed between the support or the sub-layer (if need be) and the decoration. In this last case, it is not necessary that the finishing layer be transparent since the decoration covers the finishing layer, as illustrated by FIG. 7 hereinafter.

If the decoration comprises a heat-stable binder, the latter must not only be compatible with the substrate and/or, if need be with the sub-layer, but also with the finishing layer.

The decoration of the heat-stable coating according to the invention is a two-tone decoration, that is to say, that it comprises at least two different color compounds. These may be chosen among the heat-stable pigments, metal salts, semi-conductive thermochromic pigments, conductive pigments, magnetic pigments and their combinations.

The decoration according to the invention is advantageously a hyper-realistic decoration which very precisely reproduces the decoration chosen beforehand that is sought to be printed. According to a particularly advantageous embodiment of the present invention, the decoration according to the invention is at least four-color and preferably hexachrome.

It is considered different types of articles conform to the invention, of different shapes and achieved in various materials.

Thus, the support may be in a material chosen among metals, glass, ceramics and plastic materials.

By way of metal supports usable in the method of the invention, one may advantageously cite aluminum or aluminum alloy supports anodized or not, or in polished, brushed, microbeaded or sanded aluminum, treated chemically or in polished, brushed or microbeaded stainless steel, or in cast iron or aluminum, in titanium or in polished or beaten copper.

The heating article according to the invention may particularly be a culinary article, and in particular a culinary article whereof one of the opposite sides is a concave inner side intended to be arranged on the side of the foods liable to be introduced in said article, and a second of said opposite sides is an outer convex side intended to be arranged towards a heat source.

By way of non-limiting examples of culinary articles conforming to the present invention, will be particularly cited culinary articles such as pans and frying pans, woks and fryers, stewpots and pots, crepe pans, grills, molds and baking plates, plates and barbecue grills, preparation bowls.

Other types of supports can also be considered, not limited to the sole culinary field. Thus, one may also consider by way of articles conform with the invention household appliances such as irons, curling irons, hair straighteners etc., isothermal pots (for coffee machines for example) or mixing bowls.

In the case where the heating article according to the invention is a culinary article such as described above, the decoration is advantageously presented in the form of a continuous or discontinuous layer, which may be arranged either on the inner side of the article, or on its outer side. As previously indicated, the decoration may either be exempt from binders or comprise a heat-stable binder.

If the decoration is arranged on the inner side of the culinary article, the heat-stable binder will be preferably chosen among fluorocarbon resins, inorganic polymers or organic-inorganic hybrids synthesized by sol-gel process, polyphenylene sulfide (PPS), ethylene sulphide polymer (PES), polyetheretherketones (PEEK), polyetherketones (PEK), polyamids-imids (PAI), polybenzimidazoles (PBI).

If the decoration is arranged on the outer side of the culinary article, the heat-stable binder will be preferably chosen among enamels, fluorocarbon resins (alone or in combination), inorganic polymers or organic-inorganic hybrids synthesized by sol-gel process, silicones, silicone-polyesters, polyimids, polyphenylene sulfide (PPS), ethylene sulphide polymer (PES), polyetheretherketones (PEEK), polyetherketones (PEK), polyamids-imids (PAI), silicones, fluorosilicones, polybenzimidazoles (PBI).

By way of non-limiting examples of culinary articles conform with the present invention, it is particularly cited culinary articles such as pans and frying pans, woks and fryers, crepe pans, grills, molds and baking plates, plates and barbecue grills.

The present invention also relates to a method for manufacturing a heating article including the following steps:
a) providing of a substrate comprising two opposite sides, whereof one is at least opaque or made opaque; then
b) achieving a heat-stable coating on said opaque side, which comprises the following steps:
b1) a step of applying on said opaque side of a composition of decoration, to form a moist layer of decoration covering at least partially said opaque side; then
b2) a heat treatment of solidifying said moist layer of the decoration, to form a decoration having the form of a continuous or discontinuous layer covering at least partially said opaque side.

According to the invention, the composition of the layer of decoration comprises at least two different color compounds and is applied by ink jet printing, and the heat treatment of solidifying the moist layer of decoration is achieved at a temperature equal to or higher than 300° C.

The substrate, the layer of decoration and the color compounds that it contains are such as defined previously.

If the substrate is not intrinsically opaque, it is indispensable to cover beforehand the side to be decorated by an opaque sub-layer, on which the decoration is printed. Such a sub-layer is such as described previously and has the above mentioned properties.

The opaque surface of the substrate (intrinsically opaque or made opaque) may relate to a step of preparation such as for example degreasing, abrasive blasting, shot-peening, brushing, grinding, satin-finishing, chemical etching, anodization.

The method according to the invention may further comprise a step of achieving a finishing layer. This step may be carried out by applying a continuous and transparent finishing composition (for the same reasons as those mentioned beforehand) on the moist layer of decoration obtained following the step b1), prior to the heat treatment b2) of solidification. The step of achieving the finishing layer may also be achieved by applying a continuous finishing layer composition (not necessarily transparent), prior to carrying out b1) of the decoration layer (31).

As aforementioned, the decoration composition can or cannot comprise a heat-stable binder: according to the porosity of the substrate or of the underlying sub-layer, the presence of this heat-stable binder will or will not be indispensable (it is indispensable in the case of a smooth substrate). The nature of the heat-stable binder is such as aforementioned.

BRIEF DESCRIPTION OF THE INVENTION

Other advantages and features of the present invention will result from the following description, given by way of non-limiting example and made with reference to the accompanying drawings.

DETAILED DESCRIPTION OF THE INVENTION

The identical elements represented on FIGS. 1 to 7 are identified by identical numerical references.

Figure 1:
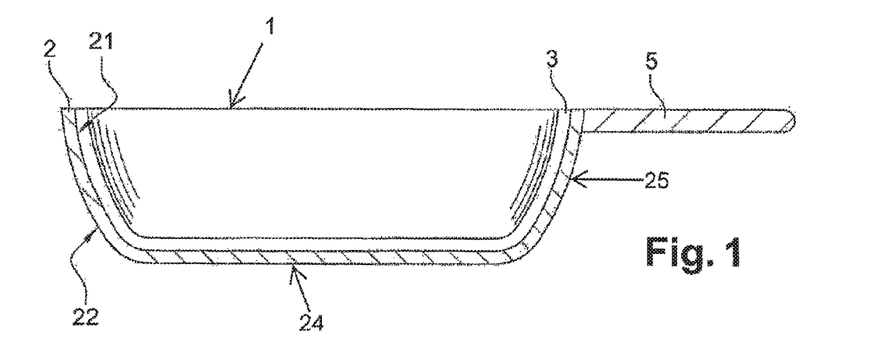
FIG. 1 represents a cross-sectional schematic view of a culinary article that conforms with the invention according to a first embodiment.
Figure 2:
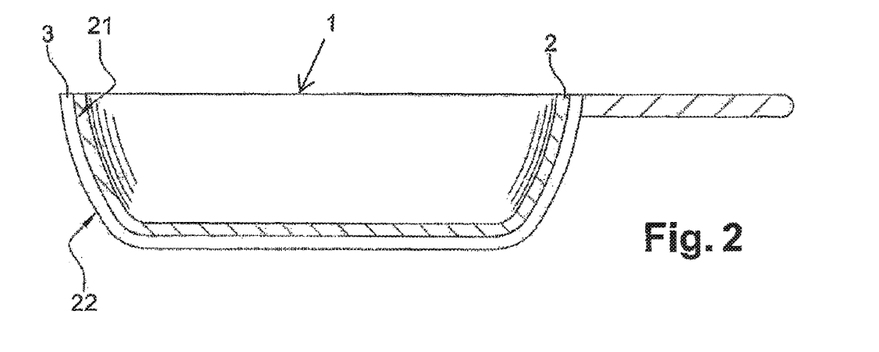
FIG. 2 represents a cross-sectional schematic view of a support of culinary article that conforms with the invention according to the second embodiment.

On FIGS. 1 and 2, it has been represented, by way of example of a culinary article according to the invention, a frying pan 1 comprising a support 2 having the form of a hollow bowl with a base 24 and a lateral wall 25 rising from the base 24, and a grip handle 5. The support 2 comprises an inner concave side 21 able to receive food, and an outer convex side 22 intended to be arranged on the side of the heat source, such as a cooking plate or a burner.

On FIG. 1, the inner side 21 of the support 2 is covered by a heat-stable coating 3 according to the invention. However, on FIG. 2, it is the outer side 22 of the support 2 which is covered by a heat-stable coating 3 according to the invention.

Figure 3:
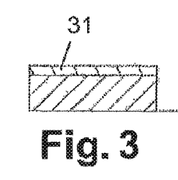
FIGS. 3 to 7 represent cross-sectional schematic views of a portion of the base of a culinary article comprising a heat-stable coating according to the invention, according to different alternative embodiments.
Figures 4, 5:
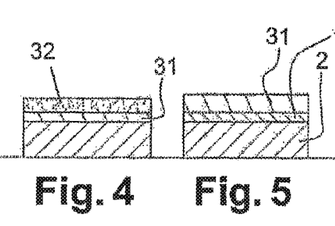

The different alternative embodiments of the heat-stable coating 3 according to the invention represented on FIGS. 1 and 2 are illustrated in a detailed manner by FIGS. 3 to 7. They correspond to top views of the base 24 of the heating article 1 represented on FIG. 1 (heat-stable coating 3 with decoration 31 on the inner side 21), or to bottom views of the base of the article represented on FIG. 2 (heat-stable coating 3 with decoration 31 on the outer side 22):
  on FIG. 3, the heat-stable coating 3 is only constituted of the decoration 31 (continuous portion on FIG. 3), which is directly arranged on the support 2, that is to say:
    either directly on the inner side 21 in the case of the embodiment illustrated on FIG. 1; in this case, FIG. 3 is a cross-sectional view of the base of the article 1,
    or directly on the outer side 22 in the case of the embodiment illustrated on FIG. 2; in this case, FIG. 3 is a cross-sectional view of the base of the article 1;
  FIG. 4 differs from FIG. 3 by the presence of a continuous and transparent finishing layer 32 arranged on the decoration 31;
  FIG. 5 differs from FIG. 3 by the presence of an opaque sub-layer 4, between the decoration 31 and the support 2, that is to say the inner side 21 for the embodiment illustrated on FIG. 1 (top view) or the outer side 22 for the embodiment illustrated on FIG. 2 (bottom view),
  FIG. 6 differs from FIG. 5 by the presence of a continuous and transparent finishing layer 32 arranged on the decoration 31 on FIG. 6,
  FIG. 7 differs from FIG. 5 by the presence of a continuous finishing layer 32 arranged between the sub-layer 4 and the decoration (31).

The compositions of the decoration 31 and finishing layers, as well as the heat-stable binder of these layers (if need be) are such as described beforehand.

On FIG. 8, is represented a cross-sectional schematic view of an industrial device for ink jet decorating operating according to the "drop on demand" technology "DOD". The operating of this device is that described in international patent WO 2006/126189. It consists in a piezoelectric DOD-type method, for which the drops required for printing are created by the deformation of the wall of the ink container, as a result of an electrical excitation of a piezoelectric crystal.

The invention is illustrated in further detail in the following examples.

In these examples, except otherwise indicated, all percentages and portions are expressed in weight.

EXAMPLES (DOD) Operating Ink Jet Decorating Device

As printing device, a printer commercialized by KERA-JET is used, for example using a printer of commercial reference 700x, usually intended for the printing of ceramic squares.

Products

Supports:

Aluminum disks with a diameter of 31 cm and a thickness of 2.4 mm.

Inks:

Inks for Ink Jet Printing on Heat-Stable Coating of Ceramic Type (Enamel or Sol-Gel)
  blue-colored inks commercialized by company FERRO CORPORATION under trade names QuickPaint inks or KeramInks,
  orange-colored inks commercialized by company FERRO under trade names QuickPaint inks or KeramInks,
  brown-colored inks commercialized by company FERRO under trade names QuickPaint inks or KeramInks,
  yellow-colored inks commercialized by company FERRO under trade names QuickPaint inks or KeramInks,
  pink-colored inks commercialized by company FERRO under trade names QuickPaint inks or KeramInks,
  black-colored inks commercialized by company FERRO under trade names QuickPaint inks or KeramInks.

Pigmented Aqueous Inks for Ink Jet Printing on Non-Enameled Heat-Stable Coatings It consists of aqueous formulations adapted for ink jet printing such as known by the skilled person. These formulations contain inorganic pigments allowing for a good hold in temperature of the colors, water as a main vehicle with at least a co-solvent and at least a dispersant to enable a good stability of the pigments in suspension.

The choice of pigments could be done as follows:
  for blue ink, a cobalt blue will be for example taken (Color index PB28),
  for the red, a red iron oxide (Color index PR101),
  for the yellow, a yellow iron oxide (Color index PY42), and
  for the black, a carbon black (Color index PBk7).

These inks are prepared as follows:

1/Preparation of a Pigment Paste
  First, a pigment paste corresponding to each color is prepared. It consists in a dispersion comprising between 10 and 70% of pigment, 30 to 90% water and 0.1 to 10% of a dispersant (for example Disperbyk 192). This dispersion is prepared in a crusher (for example the marble crusher of LMZ type commercialized by the Netzsch GmbH company) making it possible to reduce the granulometry of the pigments such that all the particles be of size lower than 500 nanometers, or that this maximum size may be easily attained by a step of filtration, so as not to risk blocking the nozzles of the printing head.

2/Preparation of the Aqueous Ink
  A standard formula ejectable by ink jet may be composed as follows:
  2 to 50% pigment paste
  20 to 70% water 10 to 80% solvents making it possible to adjust the viscosity and the surface tension of the formula: for example a mixture of glycerol/ethylene glycol with a ration ranging between 1 and 5. The viscosity of the final ink should range between 5 and 20 cP at its temperature of use (temperature in the printing head, for example ranging between the ambient temperature and 40° C.) and its superficial tension will range between 22 and 40 mN/m.

Enamel Heat-Stable Coating

A first fritted white enamel barbotine B1 is prepared based on fritted white enamel F1, whereof the composition is given in table 1 below:

TABLE 1

Formula of the frit for white enamel F1

| Oxide of | Parts in weight | variation |
|---|---|---|
| Na | 24.57 | 20-35 |
| Si | 40.67 | 32-48 |
| K | 18.33 | 13-23 |
| V | 7.60 | 0-12 |
| Sb | 4.38 | 0-8 |
| BA | 4.45 | 0-6 |
| Total | 100 | 20-35 |

The composition of barbotine B1 is given herebelow:
Frit F1: 100 parts in weight,
Boric acid: 3 parts in weight,
Potash: 1.5 parts in weight,
Titanium dioxide: 20 parts in weight,
Water: 55 parts in weight.

A second finishing fritted enamel barbotine B2 is prepared from a finishing fritted enamel F2, whereof the composition is given in table 2 herebelow:

TABLE 2

Formula of the finishing enamel frit F2

| Oxide of | Parts in weight | variation |
|---|---|---|
| Na | 21.01 | 15-30 |
| Si | 35.86 | 20-45 |
| K | 16.49 | 10-20 |
| Ti | 21.17 | 15-25 |
| V | 5.47 | 0-10 |
| Total | 100 | |

The composition of the barbotine B2 is given herebelow:
Frit F2: 100 parts in weight,
Boric acid: 3 parts in weight,
Potash: 1 part in weight,
Water: 52 parts in weight.

PTFE-Based Fluorocarbon Heat-Stable Coating

A first white polytetrafluoroethylene-based screen printing paste PS1 is prepared of which the composition is given herebelow:
PTFE dispersion at 60% dry matter and of average particle size of 220 nm: 50%
water: 10%
pigment paste $TiO_2$: 20% [TiO2 pigment/water 50:50]
propylene glycol: 15%
acrylic thickener such as those commercialized by PolymerLatex GmbH: 3%
ammonia: 2%

A second colorless polytetrafluoroethylene-based screen printing paste PS2 is prepared of which the composition is given herebelow:
PTFE dispersion at 60% dry matter and particle size of 220 nm: 80%
water: 2%
propylene glycol: 15%
acrylic thickener such as those commercialized by PolymerLatex GmbH: 3%
ammonia: 1%

Sol-Gel Heat-Stable Coating

A sol-gel composition SG1 is prepared based on a mixture of TEOS (tetraethoxysilane) and MTMS (methyltrimethoxysilane) in alkaline medium containing titanium dioxide as white pigment. A composition is given herebelow:
20% to 40% in weight of tetraethoxysilane (TEOS);
40% to 50% in weight of methyltrimethoxysilane (MTMS);
2 l to 4 l of silica sol, with a $SiO_2$ content, between 10% and 40%;
0% to 40% in weight of micronized $SiO_2$ particles;
0% to 5% in weight of Boron trimethoxide (TMB);
0% to 5% in weight of sodium ethoxide;
0% to 5% in weight of potassium ethoxide;
0% to 5% in weight of sodium formate;
0% to 5% in weight of potassium formate;
0% to 5% in weight of aluminum acetylacetonate;
20% to 50% in weight of ethanol, propanol, butylglycol, or hexylene glycol;
0% to 10% in weight of sodium hydroxide;
0% to 5% in weight of stabilizers, surface modifiers, rheological additives;
6% to 12% in weight of TiO2 as pigment.

The indicated mass percentages are such with respect to the total weight of the sol-gel composition.

Example 1

Culinary Article in Aluminum with an Outer Enamel Coating on which is Printed a Hyper-Realistic Decoration in Continuous Tones at the Base.

Based on an aluminum disk, a press makes it possible to obtain a bowl 2 in the shape of a frying pan (flat base with skirt such as illustrated on FIGS. 1 and 2).

This bowl 2 is degreased beforehand in an alkaline solution.

The aqueous barbotine B1 is applied by spraying it on the entirety of the outer side in order to obtain a non cured white enamel layer 3. A step of drying makes it possible to obtain the biscuit enamel 3.

By ink jet, is printed, by means of the device illustrated on FIG. 8, a hyper-realistic decoration 31 on the base 24 of the bowl 2 covered with biscuit 3.

The printer by brand KERAJET® makes it possible to reproduce the decoration in a hyper-realistic manner by hexachrome process based on six inks of different colors for heat-stable coatings of ceramic type such as those described beforehand, preferably, of the same brand.

The thus, enamel-coated 3 bowl 2 provided with the hyper-realistic decoration 31 then undergoes a heat treatment of curing at a temperature of 560° C. during 15 minutes, after which an enamel coating is obtained with a very consistent reproduction of the decoration chosen on the entire flat portion of the article (base), this decoration growing paler on the skirt.

The totality of the thus, formed coating 3 retains all the characteristics of an even enameled coating: shine, hardness, choc-resistance, flame-resistance, resistant to the corrosion of detergents used in dish-washers.

The configuration of the thus, obtained coating 3 corresponds to that of FIG. 5.

Example 2

Culinary Article in Aluminum with an Outer Enamel Coating on which is Printed a Hyper-Realistic Decoration in Continuous Tones at the Base.

Based on an aluminum disk, a press makes it possible to obtain a bowl 2 in the shape of a frying pan (flat base with skirt such as illustrated on FIGS. 1 and 2).

This bowl 2 is degreased beforehand in an alkaline solution.

The aqueous barbotine B1 is applied by spraying it on the entirety of the outer side in order to obtain a non cured white enamel layer 3. The finishing barbotine B2 is applied by spraying. A step of drying makes it possible to obtain the biscuit enamel 3.

By ink jet, is printed, by means of the device illustrated on FIG. 8, a hyper-realistic decoration 31 on the base 24 of the bowl 2 covered with biscuit 3.

The printer by brand KERAJET® makes it possible to reproduce the decoration in a hyper-realistic manner by hexachrome process based on six inks of different colors for heat-stable coatings of ceramic type such as those described beforehand, preferably, of homogenous brand.

The thus, enamel-coated 3 bowl 2 provided with the hyper-realistic decoration 31 then undergoes a heat treatment of curing at a temperature of 560° C. during 15 minutes, after which an enamel coating is obtained with a very consistent reproduction of the decoration chosen on the entire flat portion of the article (base), this decoration growing paler on the skirt.

The totality of the thus, formed coating 3 retains all the characteristics of an even enameled coating: shine, hardness, choc-resistance, flame-resistance, resistant to the corrosion of detergents used in dish-washers.

The configuration of the thus, obtained coating 3 corresponds to that of FIG. 7.

Example 3

Culinary Article in Aluminum with an Outer Enamel Coating on which is Printed a Hyper-Realistic Decoration in Continuous Tones at the Base.

Based on an aluminum disk, a press makes it possible to obtain a bowl 2 in the shape of a frying pan (flat base with skirt such as illustrated on FIGS. 1 and 2).

This bowl 2 is degreased beforehand in an alkaline solution then satin-finished in order to give a white-colored homogenous surface.

The aqueous barbotine B2 is then applied by spraying it on the entirety of the outer side in order to obtain a non cured enamel layer 3. A step of drying makes it possible to obtain the biscuit enamel 3.

By ink jet, is printed, by means of the device illustrated on FIG. 8, a hyper-realistic decoration 31 on the base 24 of the bowl 2 covered with biscuit 3. The printer by brand KERAJET® makes it possible to reproduce the decoration in a hyper-realistic manner by hexachrome process based on six inks of different colors for heat-stable coatings of ceramic type such as those described beforehand, preferably, of the same brand.

The thus, enamel-coated 3 bowl 2 provided with the hyper-realistic decoration 31 then undergoes a heat treatment of curing at a temperature of 560° C. during 15 minutes, after which an enamel coating is obtained with a very consistent reproduction of the decoration chosen on the entire flat portion of the article (base), this decoration growing paler on the skirt.

The totality of the thus, formed coating 3 retains all the characteristics of an even enameled coating: shine, hardness, choc-resistance, flame-resistance, resistant to the corrosion of detergents used in dish-washers.

The configuration of the thus, obtained coating 3 corresponds to that of FIG. 5 (but by replacing the sub-layer by the finishing layer).

Example 4

Culinary Article in Aluminum with an Outer PTFE Coating on which is Printed a Hyper-Realistic Decoration in Continuous Tones.

An aluminum disk is treated beforehand either in a chemical or a mechanical manner such as to bring a surface roughness allowing for good adhesion.

The white screen printing paste PS1 is applied by screen printing on the entirety of one of the sides in order to obtain a white, non cured PTFE layer of coating 3. This layer of coating may possibly be dried for a few minutes or may be used without a step of drying. In the event of drying, a cooling device makes it possible to present the disk under the printing head at a temperature below 40° C. in order to prevent the ink from drying under the nozzles.

By ink jet, is printed, by means of the device illustrated on FIG. 8, a hyper-realistic decoration 31 on the side 24 of the aluminum disk covered with the white layer 3. The printer by brand KERAJET® makes it possible to reproduce the decoration in a hyper-realistic manner by four-color process based on four aqueous pigmented inks such as those described beforehand.

The disk thus coated with the PTFE-based formula is provided with the hyper-realistic decoration 31 then undergoes a heat treatment of curing at a temperature of 420° C. during 10 minutes, after which a PTFE coating is obtained with a very consistent reproduction of the chosen decoration. The disk is then stamped by the press such as to obtain a bowl 2 in the shape of frying pan (flat base with skirt such as illustrated on FIGS. 1 and 2).

The thus, treated decoration 31 has excellent adhesion on the white sub-layer 3.

The totality of the thus, formed coating 3 retains all the characteristics of an even PTFE coating: anti-adhesion, chemical resistance, flame-resistance, resistant to the corrosion of detergents used in dish-washers.

The configuration of the thus, obtained coating 3 corresponds to that of FIG. 5.

Example 5

Culinary Article in Aluminum with an Outer PTFE Coating on which is Printed a Hyper-Realistic Decoration in Continuous Tones.

An aluminum disk is treated beforehand either in a chemical or a mechanical manner such as to bring a surface roughness allowing for good adhesion.

The white screen printing paste PS1 is applied by screen printing on the entirety of one of the sides in order to obtain a white, non cured PTFE layer of coating 3. A step of drying between 70° and 120° C. makes it possible to obtain the sub-layer 3. A cooling device makes it possible to present the disk under the printing head at a temperature below 40° C. in order to prevent the ink from drying under the nozzles.

By ink jet, is printed, by means of the device illustrated on FIG. 8, a hyper-realistic decoration 31 on the side 24 of the aluminum disk covered with the white layer 3. The printer by brand KERAJET® makes it possible to reproduce the decoration in a hyper-realistic manner by four-color process based on the four aqueous pigmented inks such as those described beforehand.

Then, the colorless screen printing paste PS2 is applied such as to entirely cover the decorated sub-layer 3.

The disk thus coated in PTFE-based formulation 3 is provided with the hyper-realistic decoration 31 then undergoes a heat treatment of curing at a temperature of 420° C. during 10 minutes, after which a PTFE coating is obtained with a very consistent reproduction of the chosen decoration. The disk is then stamped by the press such as to obtain a bowl 2 in the shape of frying pan (flat base with skirt such as illustrated on FIGS. 1 and 2).

The totality of the thus, formed coating 3 retains all the characteristics of an even PTFE coating: anti-adhesion, chemical resistance, flame-resistance, resistant to the corrosion of detergents used in dish-washers.

Figure 6:
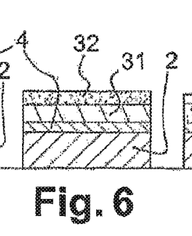

The configuration of the thus, obtained coating 3 corresponds to that of FIG. 6.

Example 6

Culinary Article of Glass with an Outer Sol-Gel Coating on which is Printed a Hyper-Realistic Decoration at the Base.

One starts with a circular glass bowl 2 having the shape of an oven dish that is degreased through alkaline process.

The sol-gel composition SG1 is applied on the outer side of the substrate. Then, it is dried at 100° C. by making sure to keep a not entirely cross-linked film.

Then, by ink jet, is printed, by means of the device illustrated on FIG. 8, a hyper-realistic decoration 31 on the base 24 of the bowl 2 covered in the dried sol-gel composition 3. The printer by brand KERAJET® makes it possible to reproduce the decoration in a hyper-realistic manner by hexachrome process based on six different-colored inks for heat-stable coatings of ceramic-type such as described beforehand, preferably of the same brand.

The thus, sol-gel coated 3 bowl 2 is provided with the hyper-realistic decoration 31 and then undergoes a heat treatment of curing at a temperature of 450° C. during 120 minutes, after which a coating with a very consistent reproduction of the chosen decoration is obtained on the entire flat portion of the article (base), this decoration growing paler on the skirt.

The totality of the thus, formed coating 3 retains all the characteristics of an even sol-gel coating: shine, hardness, choc-resistance, flame-resistance, resistance to the corrosion of detergents used in dish-washers.

The configuration of the thus, obtained coating 3 corresponds to that of FIG. 5.

Example 7

Culinary Article of Glass with an Outer Sol-Gel Coating on which is Printed a Hyper-Realistic Decoration at the Base.

One starts with a circular glass bowl 2 having the shape of an oven dish that is degreased through alkaline process.

The composition SG1 is applied on the outer side. After applying the SG1 composition, it is dried at 100° C. by making sure to keep a non entirely cross-linked film. A cooling device makes it possible to present the glass bowl under the printing head at a temperature below 40° C. in order to prevent the ink from drying under the nozzles.

Then, by ink jet, is printed, by means of the device illustrated on FIG. 8, a hyper-realistic decoration 31 on the base 24 of the bowl 2 covered with the dried sol-gel composition 3. The printer by brand KERAJET® makes it possible to reproduce the decoration in a hyper-realistic manner by hexachrome process based on 4 aqueous pigmented inks chosen among the aforementioned inks.

The thus, sol-gel coated 3 bowl 2 is provided with the hyper-realistic decoration 31 and then undergoes a heat treatment of curing at a temperature of 300° C. during 15 minutes, after which a coating with a very consistent reproduction of the decoration chosen is obtained on the entire flat portion of the article (base), this decoration growing paler on the skirt.

The totality of the thus, formed coating 3 retains all the characteristics of an even sol-gel coating: shine, hardness, choc-resistance, flame-resistance, resistance to the corrosion of detergents used in dish-washers.

The configuration of the thus, obtained coating 3 corresponds to that of FIG. 5.

Comparative Example 8

Culinary Article in Aluminum with an Outer Enamel Coating on which is Printed a Hyper-Realistic Decoration in Continuous Tones at the Base.

Based on an aluminum disk, a press makes it possible to obtain a bowl 2 in the shape of a frying pan (flat base with skirt such as illustrated on FIGS. 1 and 2).

This bowl 2 is degreased beforehand in an alkaline solution.

The barbotine B1 is applied by spraying on the outer side. In order to obtain an enamel coating this enamel coating is steamed during 15 minutes at 560° C.

After cooling, an organic acrylic sub-layer of composition similar to that of Korean application KR2007/0117247 and the decoration is achieved by means of a reactive ink that is protected by a finishing layer.

After curing at 250° C., a hyper-realistic decoration that does not adhere to the enamel is obtained.

After three passages in the dish-washer, the decoration has entirely disappeared.

Comparative Example 9

Culinary Article in Aluminum with an Outer Enamel Coating on which is Printed a Hyper-Realistic Decoration in Continuous Tones at the Base.

Based on an aluminum disk, a press makes it possible to obtain a bowl 2 in the shape of a frying pan (flat base with skirt such as illustrated on FIGS. 1 and 2).

This bowl 2 is degreased beforehand in an alkaline solution then satin-finished in order to give a white-colored homogenous surface.

An organic acrylic sub-layer is applied on the outer side by spraying such as described in Korean patent KR2007/0117247 and the decoration is achieved by means of a reactive ink that is protected by a barbotine B2. This enamel coating is steamed during 15 minutes at 560° C. in order to obtain an enamel coating. After cooling, it is noticed that the decoration has entirely disappeared by combustion and that the enamel shows an unappealing brown tint.

Comparative Example 10

Culinary Article in Aluminum with an Outer PTFE Coating on which is Printed a Hyper-Realistic Decoration at the Base.

An aluminum disk is treated beforehand in a chemical or a mechanical manner such as to bring a surface roughness allowing for good adhesion.

The white screen printing paste PS1 is applied by screen printing on the entirety of one of the sides in order to obtain a white non cured PTFE coating layer 3. A drying step at 200° C. makes it possible to obtain the sub-layer 3.

On this sub-layer is deposited a transparent organic receiving layer of ink such as described in Korean patent KR 2007/0117247, involving a thinner and a hardener of organic nature in order to allow for a good adhesion of the projected ink.

After the ink jet printing of the patterns on the receiving layer, a protective coating layer PS2 is applied on the printed patterns.

The disk then undergoes a curing at a temperature below 300° C. then stamped such as to obtain a bowl 2 in the shape of a frying pan (flat base with skirt such as illustrated on FIGS. 1 and 2).

It is then obtained a culinary article whereof the PTFE coating does not have the characteristics of an even PTFE coating: bad cohesion of the film, no anti-adhesion or chemical resistance. The curing temperature below 300° C. is not sufficient to allow for a good sintering of the PTFE particles.

Comparative Example 11

Culinary Article in Aluminum with an Outer PTFE Coating on which is Printed a Hyper-Realistic Decoration at the Base.

An aluminum disk is treated beforehand in a chemical or a mechanical manner such as to bring a surface roughness allowing for good adhesion.

The white screen printing paste PS1 is applied by screen printing on the entirety of one of the sides in order to obtain a white non cured PTFE coating layer 3. A drying step at 200° C. makes it possible to obtain the sub-layer 3.

On this sub-layer is deposited a transparent organic receiving layer of the ink such as described in Korean patent KR 2007/0117247, involving a thinner and a hardener of organic nature in order to allow for a good adhesion of the projected ink.

After ink jet printing the patterns on the receiving layer, a protective coating layer PS2 is applied on the printed patterns.

The disk then undergoes a curing at a temperature of 420° C. during 10 minutes then stamped such as to obtain a bowl 2 in the shape of a frying pan (flat base with skirt such as illustrated on FIGS. 1 and 2).

After cooling, it is noticed that the PTFE coating has an unappealing brown tint: the organic receiving layer has been totally damaged by combustion and the degradation components conceal the decoration.

The invention claimed is:

1. A heating article comprising a substrate having two opposite sides, wherein at least one of the sides is opaque, and a heat-stable coating arranged on said opaque side, wherein:
   said heat-stable coating comprises an at least a two-color decoration in continuous tones having the form of one of a continuous or discontinuous layer,
   said decoration is applied by ink jet printing, and
   said article has undergone a solidification heat treatment at a temperature equal to or higher than 300° C.,
   wherein the opaque side is intrinsically opaque or is formed by a continuous opaque sub-layer.

2. The heating article according to claim 1, wherein the decoration is arranged on the opaque sub-layer, which covers one of the sides of said substrate.

3. The heating article according to claim 2, wherein the decoration contains no binders.

4. The heating article according to claim 1, wherein the heat-stable coating further comprises a continuous and transparent finishing layer arranged on the decoration.

5. The heating article according to claim 2, wherein the heat-stable coating further comprises a continuous finishing layer arranged between one of the substrate or the sub-layer and the decoration.

6. The heating article according to claim 5, wherein the decoration comprises at least a heat-stable binder that is compatible with the substrate and/or, with the sub-layer and/or the finishing layer.

7. The heating article according to claim 6, wherein the heat-stable binder of the decoration is chosen among enamels, fluorocarbon resins (alone or in combination), inorganic polymers or organic-inorganic hybrids synthesized by sol-gel process, silicones, silicone-polyesters, polyimids, polyphenylene sulfide (PPS), polyethylene sulfide (PES), polyetheretherketones (PEEK), polyetherketones (PEK), polyamid-imids (PAI), fluorosilicones, and polybenzimidazoles (PBI).

8. The heating article according to claim 1, wherein the decoration comprises at least two different color compounds chosen among heat-stable pigments, metal salts, semi-conductive thermochromic pigments and combinations thereof.

9. The heating article according to claim 1, wherein the decoration is at least four-colors.

10. The heating article according to claim 1, wherein the substrate is of a material chosen among metals, glass, ceramics and plastic materials.

11. The heating article according to claim 10, wherein the substrate is a metal of one of an aluminum or aluminum alloy having a polished, brushed, microbeaded or sanded surface finish, or of treated chemically, polished, brushed or microbeaded stainless steel, or of cast aluminum, titanium or of polished or beaten copper or in cast iron.

12. The heating article according to claim 1, wherein the heating article constitutes a culinary article whereof one of the opposite sides is a concave inner side intended to be arranged on a food contacting side of said culinary article, and wherein a second of said opposite sides is an outer convex side intended to be arranged towards a heat source.

13. The heating article according to claim 1, wherein the decoration is in the form of one of a continuous or discontinuous layer arranged on an inner side of the article.

14. The heating article according to claim 13, wherein the decoration contains no binders.

15. The heating article according to claim 13, wherein the decoration comprises a heat-stable binder chosen among fluorocarbon resins, inorganic polymers or organic-inorganic hybrids synthesized by sol-gel process, polyphenylene sulfide (PPS), polyethylene sulfide (PES), polyetheretherketones (PEEK), polyetherketones (PEK), polyamid-imids (PAI), and polybenzimidazoles (PBI).

16. The heating article according to claim 1, wherein the decoration is in the form of one of a continuous or discontinuous layer arranged on an outer side of the article.

17. The heating article according to claim 16, wherein the decoration contains no binders.

18. The heating article according to claim 16, wherein the heat-stable binder of the decoration is chosen among enamels, fluorocarbon resins, inorganic polymers or organic-inorganic hybrids synthesized by sol-gel process, silicones, silicone-polyesters, polyimids, polyphenylene sulfide (PPS), polyethylene sulfide (PES), polyetheretherketones (PEEK), polyetherketones (PEK), polyamid-imids (PAI), fluorosilicones, and polybenzimidazoles (PBI).

19. The heating article according to claim 9, wherein the at least four-colors decoration is hexachrome.

* * * * *